United States Patent [19]
Riley et al.

[11] Patent Number: 5,220,789
[45] Date of Patent: Jun. 22, 1993

[54] INTEGRAL UNITARY MANIFOLD-MUFFLER-CATALYST DEVICE

[75] Inventors: James E. Riley; Thomas E. Bazil, both of Northville; William R. Adam, Birmingham; Hans P. Creutz, Saline; Robert W. McCabe, Lathrup Village; Haren S. Gandhi, Farmington Hills, all of Mich.

[73] Assignee: Ford Motor Company, Dearborn, Mich.

[21] Appl. No.: 664,722

[22] Filed: Mar. 5, 1991

[51] Int. Cl.⁵ .............................................. F01N 3/28
[52] U.S. Cl. .................................... 60/302; 181/240; 422/176; 422/180
[58] Field of Search ................. 60/299, 302; 422/176, 422/180; 181/240, 249, 251

[56] References Cited

U.S. PATENT DOCUMENTS

| | | |
|---|---|---|
| 2,881,851 | 4/1959 | Willsea . |
| 3,419,107 | 12/1968 | Jozepaitis . |
| 3,505,028 | 4/1970 | Douthit . |
| 3,581,494 | 6/1971 | Scheitlin et al. . |
| 3,957,446 | 5/1976 | Mayer et al. . |
| 4,096,691 | 6/1978 | Nohira et al. . |
| 4,151,717 | 5/1979 | Katsumoto et al. . |
| 4,420,933 | 12/1983 | Kajitani et al. . |
| 4,663,934 | 5/1987 | Sickels . |

FOREIGN PATENT DOCUMENTS

| | | | |
|---|---|---|---|
| 2345383 | 3/1975 | Fed. Rep. of Germany ........ 60/321 |
| 13021 | 2/1977 | Japan ...................................... 60/302 |
| 57-210117 | 12/1982 | Japan . |
| 58-2412 | 1/1983 | Japan . |
| 58-72613 | 4/1983 | Japan . |
| 58-107811 | 6/1983 | Japan . |
| 1-111451 | 4/1989 | Japan ................................... 422/180 |
| 1402714 | 8/1975 | United Kingdom .................. 60/302 |

*Primary Examiner*—Douglas Hart
*Attorney, Agent, or Firm*—Joseph W. Malleck; Roger L. May

[57] ABSTRACT

An integral manifold-muffler-catalyst device (for an internal combustion engine having a plurality of combustion cylinders generating exhaust gases), comprising: (a) a monolithic catalyst having a plurality of aligned passages for effecting laminar flow of the exhaust gases therethrough while; (b) a high temperature resistant chamber assembly for close-coupling the catalyst to the engine having (i) an expansion chamber for substantially dissipating low frequency standing sound waves of said exhaust gases and for modifying high frequency sound waves of said exhaust gases and (ii) manifolding passages at one side of the expansion chamber for collecting and delivering the exhaust gases from the cylinders to the expansion chamber; and (c) means for effecting converging flow from said expansion chamber to and across substantially the full entrance face of said aligned passages, as well as from the catalyst, for effecting attenuation of high frequency sound waves carried by the exhaust gases.

13 Claims, 6 Drawing Sheets

INTEGRAL UNITARY MANIFOLD-MUFFLER-CATALYST DEVICE

BACKGROUND OF THE INVENTION

Technical Field

This invention relates to the technologies of collecting, treating, and dispersing exhaust gases from an automotive engine, and more particularly to treatment of such gases with respect to noise suppression and conversion of noxious gaseous elements at or in the location of the engine manifold.

Discussion of the Prior Art

Commercially available technology for treating automotive exhaust gases separates the functions of noise suppression, catalytic conversion of noxious gaseous elements, and manifolding to be carried out by independent and separate devices. Firstly, automotive vehicles typically carry a relatively massive muffler device interposed in the tailpipe at a location proximate to the rear of the vehicle. Such muffler has a series of baffles or perforated plates within an expansion chamber which is effective to change the soundwaves, but is also effective to introduce considerable backpressure detracting from fuel economy and engine performance. Secondly, catalytic converters are typically housed in their own canisters interposed in the exhaust system at an underbody location spaced from the engine. Thirdly, manifolds have evolved as direct attachments to engine blocks for collecting exhaust gases from the individual cylinders and are usually made of cast iron to be resistant to the high exhaust gas temperatures leaving the engine exhaust ports.

Within the past several years, some initial effort has been made to combine some of such functions by: (a) use of an insulated chamber at the manifold to promote oxidation; (b) use of a catalyst at or close to the manifold; or (c) use of a muffler at or close to the manifold.

Use of insulated chambers at a manifold to promote oxidation is shown in U.S. Pat. Nos. 3,505,028; 3,581,494; 3,957,446. They illustrate how a shell and insulation is utilized to preserve the temperature of the exhaust gases which, when coupled with the introduction of oxygen, promotes immediate downstream oxidation of hydrocarbons and carbon monoxide However, this approach has certain disadvantages, including: the lack of a uniform unidirectional flow through the insulated shell avoiding promotion of a high degree of intermixing of the exhaust gases from each of the exhaust ports, the inability to reduce nitric oxides resulting from the introduction of oxygen, the inability to oxidize CO and HC to the extent required by current emission regulations, and the lack of adequate noise suppression. In summary, this approach fails to integrate within one single device a high performing muffler, a manifold that promotes a high degree of intermixing of exhaust gases, and a catalyst that converts substantially all noxious gases. A catalytic converter and a conventional commercially available downstream muffler is still needed to meet existing mandated requirements for exhaust gas treatment.

Close-coupling, only, of catalytic converters to an exhaust manifold is shown in several Japanese and U.S. Pat. No. 4,151,717; and Japanese 58-2412; 57-210117; 58-72613; 58-107811). None of these references are effective to provide high performing sound suppression; a massive downstream muffler, characteristic of the commercially available prior art, is still necessary to meet this need.

Monolithic catalytic converters, although being potentially effective for high frequency sound suppression, cannot do so without energy wave preparation in advance of the monolith. Thus, in Japanese patents 58-72613; 58-2412; and 56-95455, and U.S. Pat. Nos. 4,420,933 and 4,663,934, the use of diverging flow to the face of the catalytic converter assures that little sound muffling will take place because of the lack of attenuation of high frequency acoustic waves. Conversion efficiency of the latter references is detrimentally affected because of the lack of a streamlined, free-flowing, fully intermixed exhaust gas flow prior to entering the full face of the catalytic converter. U.S. Pat. No. 4,663,934 offers considerable constriction to the flow, preventing it from being free-flowing and promoting significant backpressure. U.S. Pat. Nos. 4,151,717, and 4,096,691 use pellet beds preventing unidirectional flow needed for enhanced conversion efficiency and for sound suppression.

Attempts by the prior art to close-couple a muffler with a manifold are shown in U.S. Pat. Nos. 2,881,851 and 3,419,107. Each uses an expansion chamber, but interrupts the chamber with a series of baffles or perforated plates to promote dissipation of the sound waves, setting up considerable backpressure detracting from fuel economy and engine performance. Moreover, these disclosures lack a high degree of muffling effectiveness because of the added necessity for sound absorbing interior coatings and the need for two exhaust pipes permitting out-of-phase sounds to cancel each other.

What is needed is an integrated device that attains the seemingly contradictory goals of: (a) exhaust flow that is free-flowing with relatively low backpressure to promote enhanced fuel economy and engine performance; (b) noise suppression equal to or better than prior art muffler devices which depend upon flow restrictors; and (c) enhanced catalytic conversion efficiency with uniform distribution of gases over the full frontal area of the catalytic converter. Additionally, it is a goal of this invention to provide flexibility to accommodate curvilinear exhaust flow paths without detrimentally affecting muffler or conversion efficiency.

SUMMARY OF THE INVENTION

One of the essential features of this invention that attains the above goals is the use of a converging flow from a close-coupled expansion chamber of critical size to a laminar flow monolith substrate for a catalytic converter.

In a first aspect, the invention is an integral manifold-muffler-catalyst device (for an internal combustion engine having a plurality of combustion cylinders generating exhaust gases), comprising: (a) a monolithic catalyst having a plurality of aligned passages for effecting laminar flow of the exhaust gases therethrough; (b) a high temperature resistant chamber assembly for close-coupling the catalyst to the engine having (i) an expansion chamber for substantially dissipating low frequency standing sound waves of said exhaust gases and for modifying high frequency sound waves of said exhaust gases, (ii) manifolding passages at one side of the expansion chamber for collecting and delivering the exhaust gases from the cylinders to the expansion chamber; and (c) means for effecting converging flow from said expansion chamber to and across substantially the full entrance face of said aligned passages of said monolithic catalyst and for effecting converging flow from said catalyst, said dual-stage convergence attenuating high frequency sound waves carried by the exhaust gases.

Preferably, the chamber assembly is dimensionally stable up to at least a temperature of 1625° F. and has a shell comprised of stainless steel. The low frequency sound waves are attenuated to an acceptable pass-through decibel level of 79 and the high frequency sound waves in the expansion chamber are modified so as to be fully attenuated in the catalyst, also to an acceptable pass-through decibel level of 79 or less. The expansion chamber must be capable of attenuating the low frequency sound waves and therefore requires an expansion volume that is in a desired range as a multiple of the displacement volume of each cylinder A converging flow means flow occurring directly from a region of a larger cross-sectional area (in this case, the close-coupled expansion chamber) to a region of smaller cross-sectional area (in this case, the monolithic catalyst element). The converging flow will result in a greater degree of flow uniformity within the body of the catalyst than currently can be obtained with conventional catalytic converters having expanding entrance cones leading to the catalyst. Flow uniformity through the interior of the catalyst is an important consideration independent of flow mixing.

Monolithic catalyst is used herein to mean a catalyst that has a cellular passage structure that promotes laminar flow. It typically is a honeycomb ceramic element of circular, oval, or racetrack geometry with a parallel array of channels (cell density of 300–600 in$^2$) coated with a thin, high surface area washcoat and precious metals. The monolith channels of the honeycomb ceramic element are characterized by a hydraulic diameter typically between 0.024–0.017 inch. Laminar flow is used herein to mean flow at a Reynold's number of 2000 or less. The catalyst itself is preferably comprised of precious metals coated onto a washcoated substrate in an amount generally between 0.1–1.0% by weight of the catalyst body.

Another aspect of this invention is an exhaust pipe system for treating and dispersing exhaust gases from combustion cylinders of an internal combustion engine carried by a multiple axle vehicle, comprising: (a) a monolithic catalyst having a plurality of aligned curvilinear passages for effecting laminar flow of the exhaust gases through a shaped path while effecting attenuation of high frequency sound waves carried by said exhaust gases, said passages having exit portions generally aligned horizontally; (b) a high temperature resistant chamber assembly for close-coupling the catalyst to the engine having an expansion chamber for substantially dissipating standing low frequency sound waves and for modifying high frequency sound waves of the exhaust gases, manifolding passages at one side of the expansion chamber for collecting and delivering the exhaust gases from the cylinders to the expansion chamber, and means for effecting converging flow from the expansion chamber to and across substantially the full entrance face of the aligned curvilinear passages; and (c) a generally horizontally extending tailpipe of uniform reduced diameter for conveying treated exhaust gases from the catalyst for dispersal behind a rear axle, said tailpipe being resiliently suspended except at its connection to the catalyst. Preferably, the curvilinear passages provide for an included angle within the range of about 10°–100° between the entering flow to said inlet and the exiting flow from said catalyst outlets. Standing low frequency sound waves refers to sound waves at the natural frequency of the tailpipe and/or engine related orders (i.e., firing frequency).

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION AND BEST MODE

Figure 1:
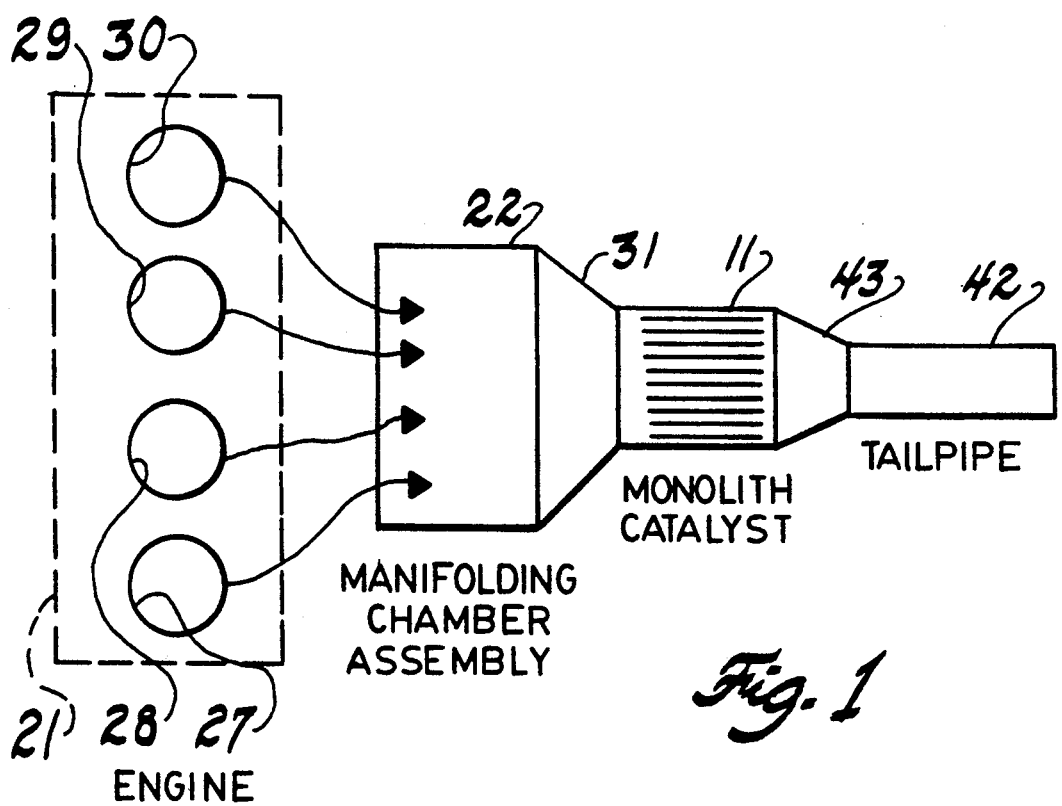
FIG. 1 is a schematic layout of the apparatus of this invention.
Figures 2, 2A:
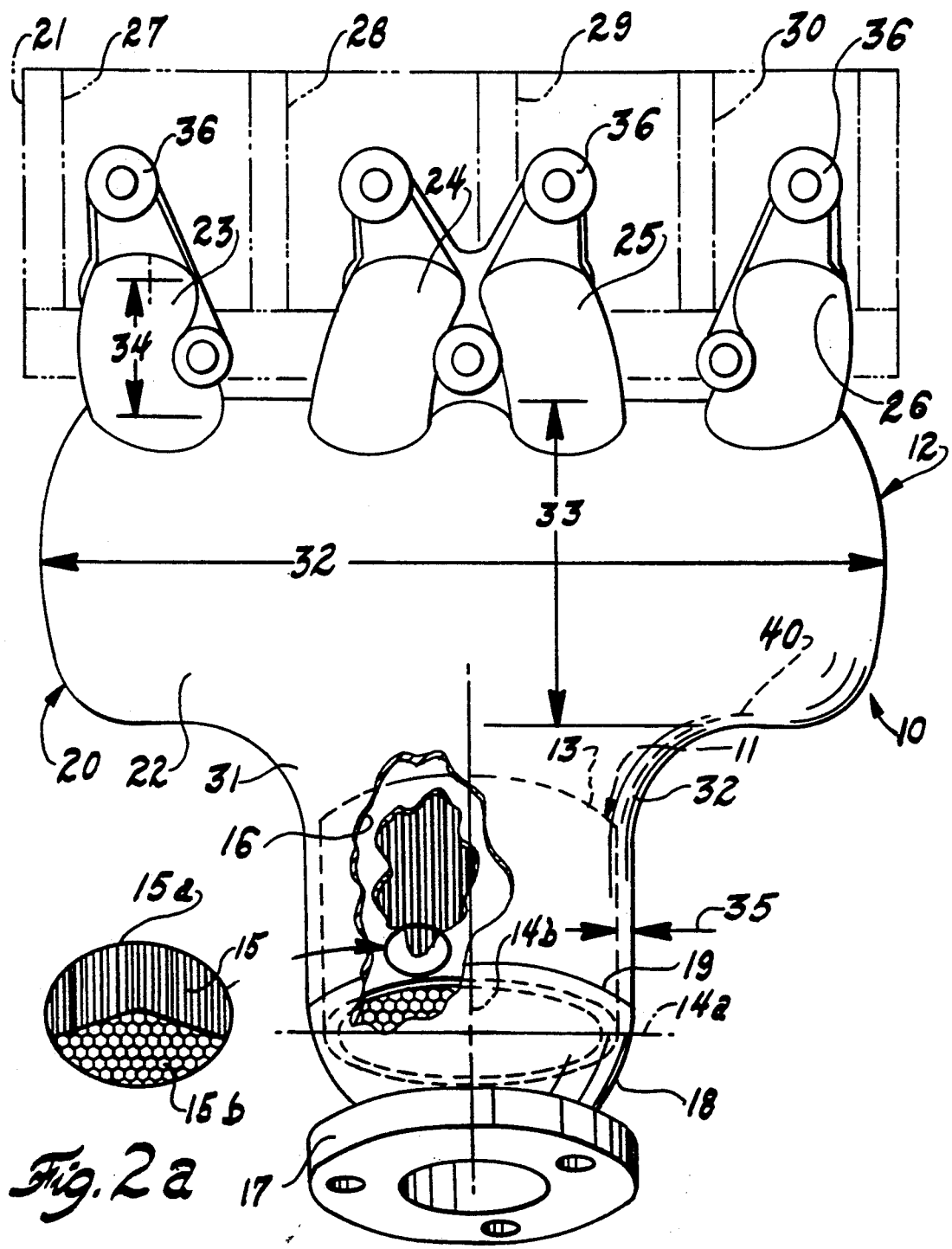
FIG. 2 is a perspective view of a properly sealed integral manifold-muffler-catalyst device of this invention shown partially broken-away.
FIG. 2a is an enlarged view of a portion of the sectioned catalyst.

As shown in FIGS. 1 and 2, the manifold-muffler-catalyst device 10 of this invention comprises at least two unique components: a monolithic catalyst 11 selected for high frequency sound attenuation and a high temperature resistant chamber assembly 12 that provides for low frequency sound attenuation, manifolding, and converging flow. The chamber assembly 12 has exhaust gas collection passages 23–26, each with a mounting flange 36 for attachment to a multicylinder internal combustion engine 21. From the exhaust ports, firing pulses of the combustion chambers (27–30) pass through respective collection passages 23–26, and thence into an expansion chamber 22 which substantially attenuates low frequency standing sound waves and modifies high frequency sound waves in such exhaust gases. The exhaust gases from the several combustion cylinders are intermixed in the expansion and pass, by way of a converging section 31, from the expansion chamber 22 to and across substantially the full entrance face 13 of the monolithic catalyst 11.

The monolithic catalyst 11 has a plurality of parallel aligned passages 11a (see FIG. 2a) for effecting laminar flow of the exhaust gases therethrough while at the same time assisting in the final attenuation of high frequency sound waves carried by the exhaust gases. Each of the aligned passages 15 has an inlet 15a and an outlet 15b. The monolithic catalyst is generally cylindrically-shaped, preferably with a transverse axis 14a greater than its transverse height axis 14b. To promote increased flow distribution, the length 37 should preferably be limited, i.e., to about four inches. The aligned passage walls are preferably coated with 0.1–1.0–by precious metals in an amount of usually about 10.1–1.0% by weight of the catalyst.

To promote uniform flow in and through the catalyst passages, the catalyst should be constructed to have a small Reynolds number which eliminates inertial effects and allows viscous effects to dominate. The brick resistance of the catalyst should be as high as possible, i.e., about 600 cpsi, to redistribute flow more uniformly. As indicated earlier, it is also an assist if the catalyst length is not too long, preferably not more than about four inches.

The design of the expansion chamber 22 and its unique positioning relative to the special design of the monolithic catalyst is of importance. By regulating the expansion chamber to promote a streamlined intermixing flow of exhaust gases emanating from the various manifolding passages 23-26 and allowing such intermixing to take place while expansion occurs, low frequency sound waves will be attenuated to an acceptable governmental pass-by noise level of about 79 decibels or less. At the same time, the high frequency sound waves are modified by induced reflection in the converging section immediately in front of face 13 creating sound wave interference. Thus, modification of the high frequency sound waves is promoted by the reflection of the acoustic waves due to discontinuity at funnel-shaped section 31 acting as a transition piece between the expansion chamber 22 and the face 13 of the catalyst, in addition to the reflection at the outlet 15b.

The interior of expansion chamber 22 is designed with smoothly curved surfaces 40 to minimize thermally induced stress while promoting stiffness to minimize noise effects of gas impingement and expansion. The expansion chamber has sufficient volume to fully expand the firing pulses prior to or in combination with the volume of the transition section. The overall attenuation of the sound waves increases with the ratio of the expansion volume to that of one total piston displacement volume. The ratio will vary with the specific output of the engine which is a function of the total mass flow. An expansion chamber capable of 20 dB(A) attenuation of the low frequency sound waves due to the firing pulses, will require a ratio of 4 for low specific output engines and as high as 12 for high specific output engines. Such 20 dB(A) attenuation is needed if the noise level of gases exiting from the engine or tailpipe with no attenuation devices is about 95-100 dB. If such unmuffled gases are at a lower decibel level, such as 85-89, then the expansion chamber need only attenuate about 10 dB and will require a volume ratio of 3 for low specific output engines and as high as 10 for high specific output engines. When expansion occurs, low frequency sound waves will be attenuated through this expansion process and is a function of the volume ratio and the specific output of the engine.

Preferred volume for effective noise attenuation is seven times the displacement of one cylinder. Although it is possible to use unidirectional vanes or perforated plates to promote greater uniform flow of gases from all of the cylinders (improving accuracy of measurements by an oxygen sensor or equivalent device used in engine calibration), there is desirably an absence of constraints in the free-flowing converging flow. The expansion chamber should be in extremely close proximity to the exhaust ports of the engine, preferably within a dimensional spacing 34 of about 75 mm or less. This manner of utilization promotes rapid warmup of the catalyst element following cold starting of the vehicle with rapid attainment of high conversion efficiency for exhaust pollutants.

In the monolithic catalyst, the modified high frequency sound waves are further substantially attenuated to a level at or below 79 decibels by virtue of the control of the monolithic laminar flow. It is desirable that the aspect ratio of the catalyst front face be within the range of 1.5 to 2.5:1 (the transverse axis 14a being a multiple of the upright axis 14b). The high frequency sound waves will be further attenuated by the close proximity of the catalyst device. The overall attenuation will result in an insertion loss that will comply with local and federal legislation. Not only are the high frequency waves modified and prepared by the effect of the converging section 31, but the high frequency waves are further attenuated when leaving the catalyst and converging at 43 again into the tailpipe 42 to promote sound wave reflections and interference.

The monolithic catalyst 11 may be suspended using a mat mount sheet material 32 which in turn is supported by the insulated shell. The shell 35 may be comprised of sheet metal such as stainless steel.

Figure 3:
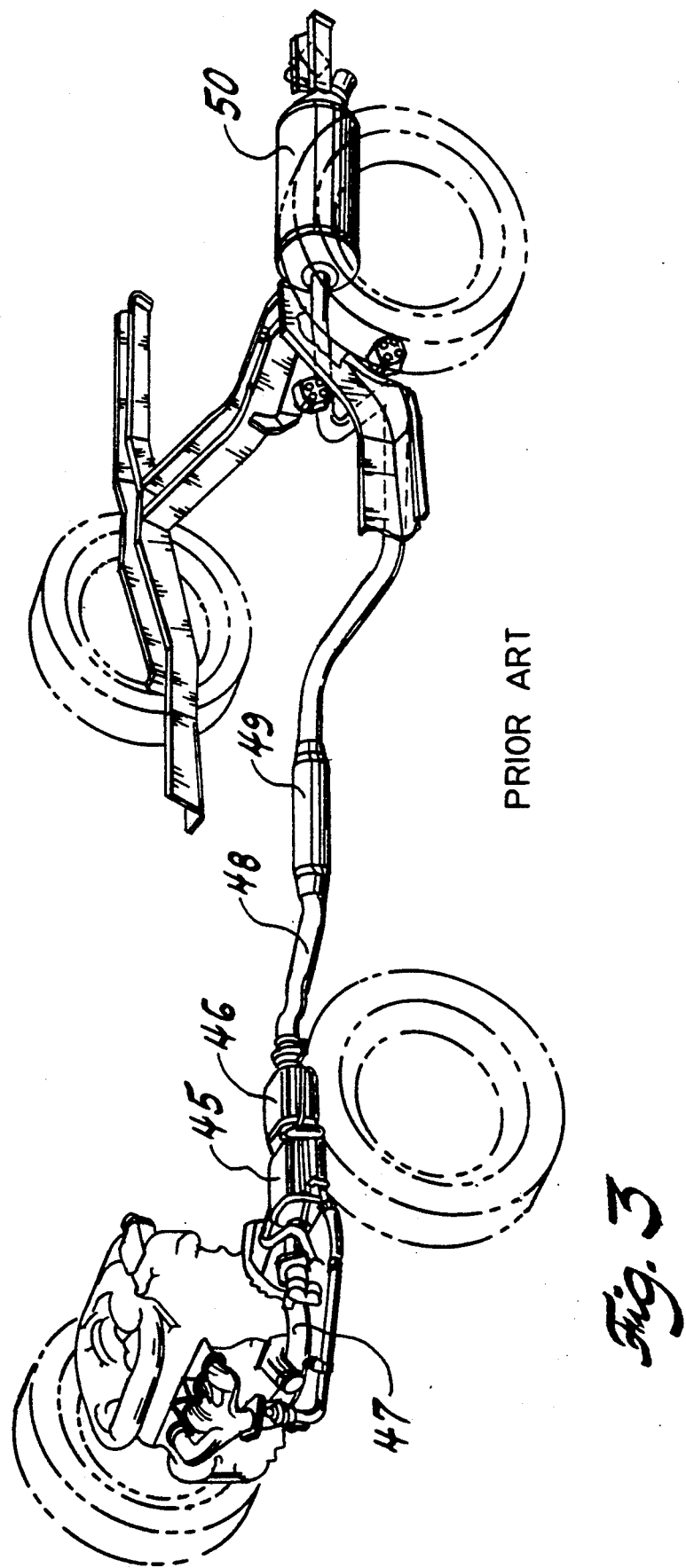
FIG. 3 is a perspective view of a partial chassis for a typical automobile of the prior art illustrating an exhaust pipe system readily available commercially.
Figure 4:
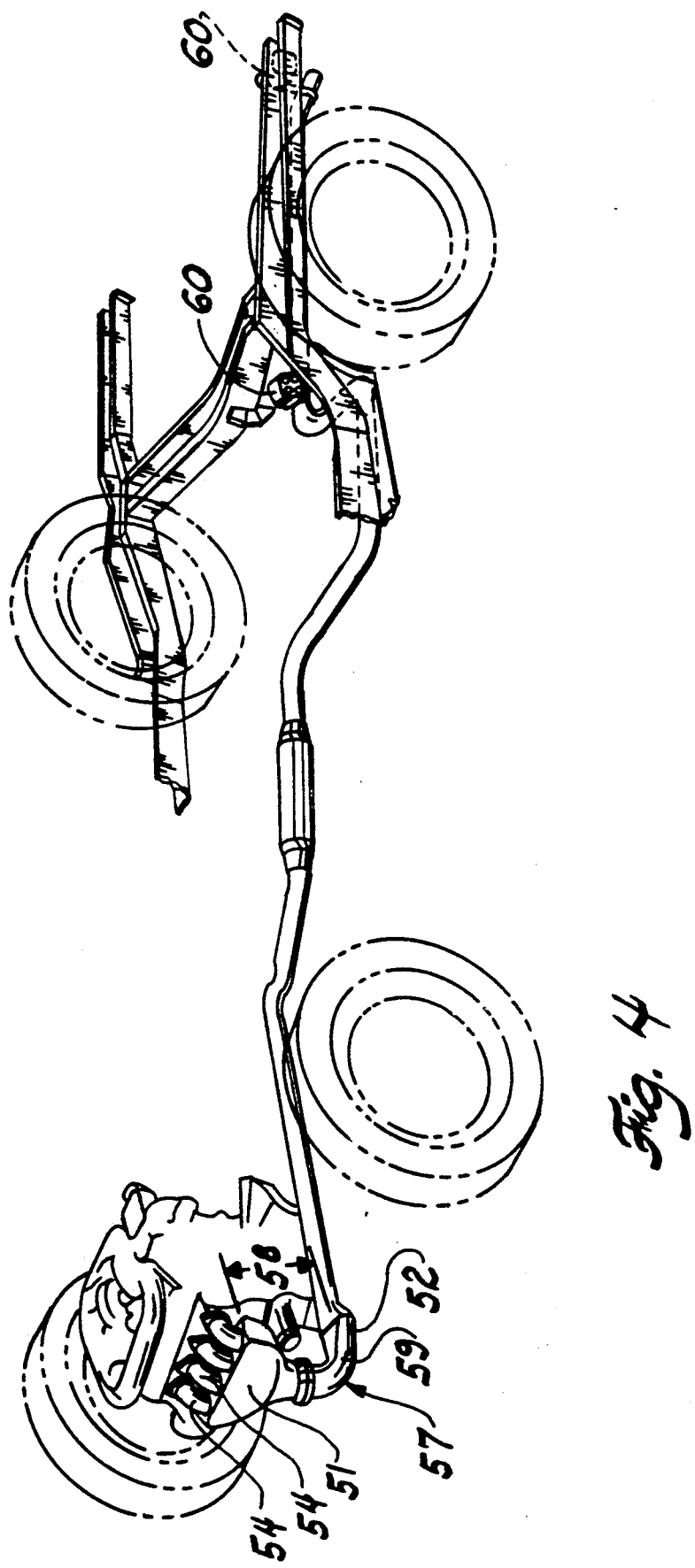
FIG. 4 is a perspective view depicting an exhaust pipe system using the device of this invention and embodying a shaped curvilinear monolithic catalyst as another aspect of this invention.

This device also lends itself to another alternative embodiment such as shown in FIG. 4. To appreciate the benefits of this alternative embodiment, FIG. 3 illustrates the mass and complexity of a typical prior art exhaust pipe system which uses one or more catalytic converters, such as 45, 46, disposed in an underbody position beneath the passenger compartment of the vehicle and fed with exhaust gases by way of a tortuous configured lead-in pipe 47. From the catalytic converters, the exhaust gas is carried by a tailpipe 48 which has interposed therein a resonator 49; the tailpipe is again interrupted by a relatively large muffler assembly 50 at or close to the rear wheels. The mass of the muffler, resonator, and the several catalytic converter canisters creates a significant design and space problem and also promotes the possibility of hazards during a rear-end crash where such massive material is available for puncturing other aspects of the vehicle.

Figure 5:
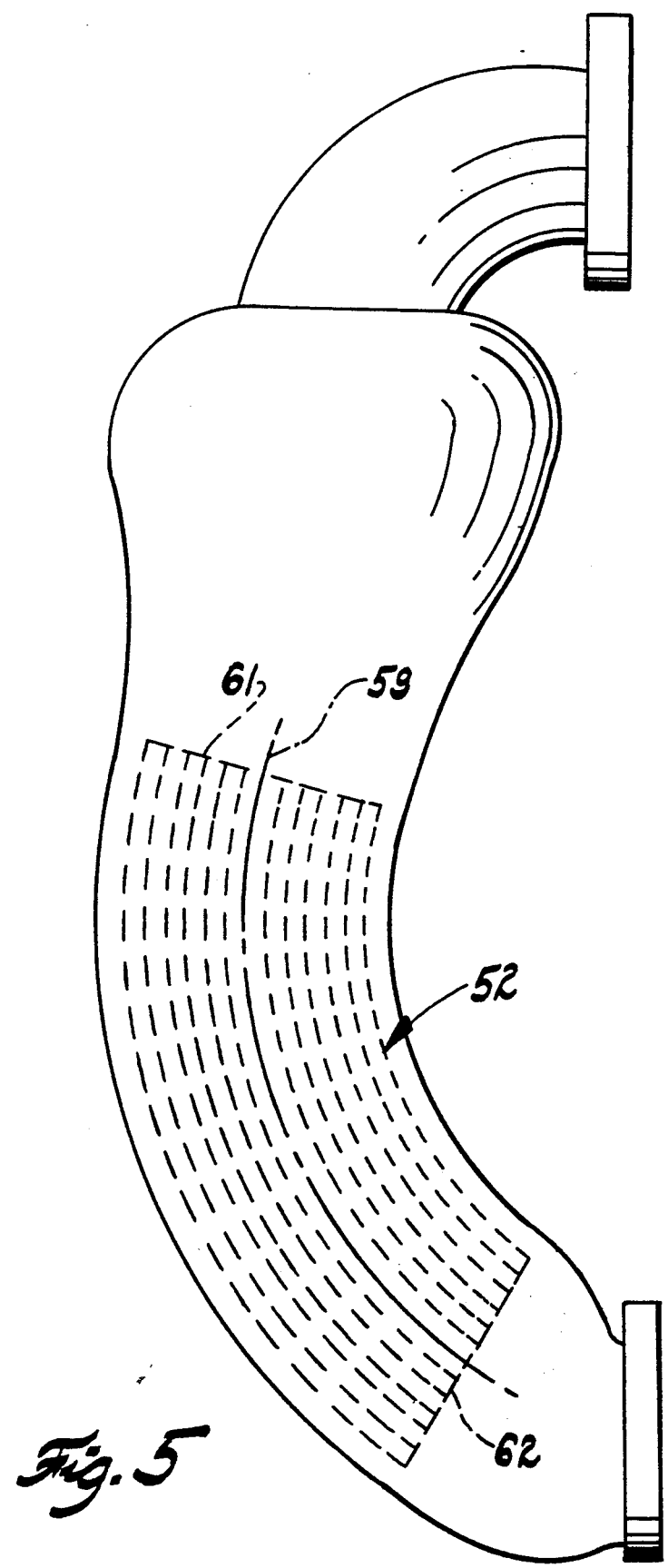
FIG. 5 is a side elevational view but for the shaped catalyst of FIG. 4.

As shown in FIG. 4, the unitary integrated manifold-muffler-catalyst device herein is particularly useful with V-6 or V-8 engine mounted transverse to the longitudinal axis of the vehicle. The forward facing exhaust passages 54 depend from the engine block, leaving little height 58 to accommodate the entire integrated device 57 in a vertically straight line. To carry the exhaust gases from such forward facing generation location and proceed immediately under the engine block, this invention has found that the monolithic catalyst 52 can be curvilinear along a path 59 between the inlet 61 (see FIG. 5) and exit 62 with little change in efficiency while retaining the expansion chamber 51 in its usual configuration with a converging flow section. The curvilinear passages of the monolith permit the device to be wrapped around the bottom of the engine block assembly thereby conserving space and promoting easier suspension for the gas pipe itself which may be resiliently supported (such as at 60) except at the connection to the unitary device itself.

Figure 6:
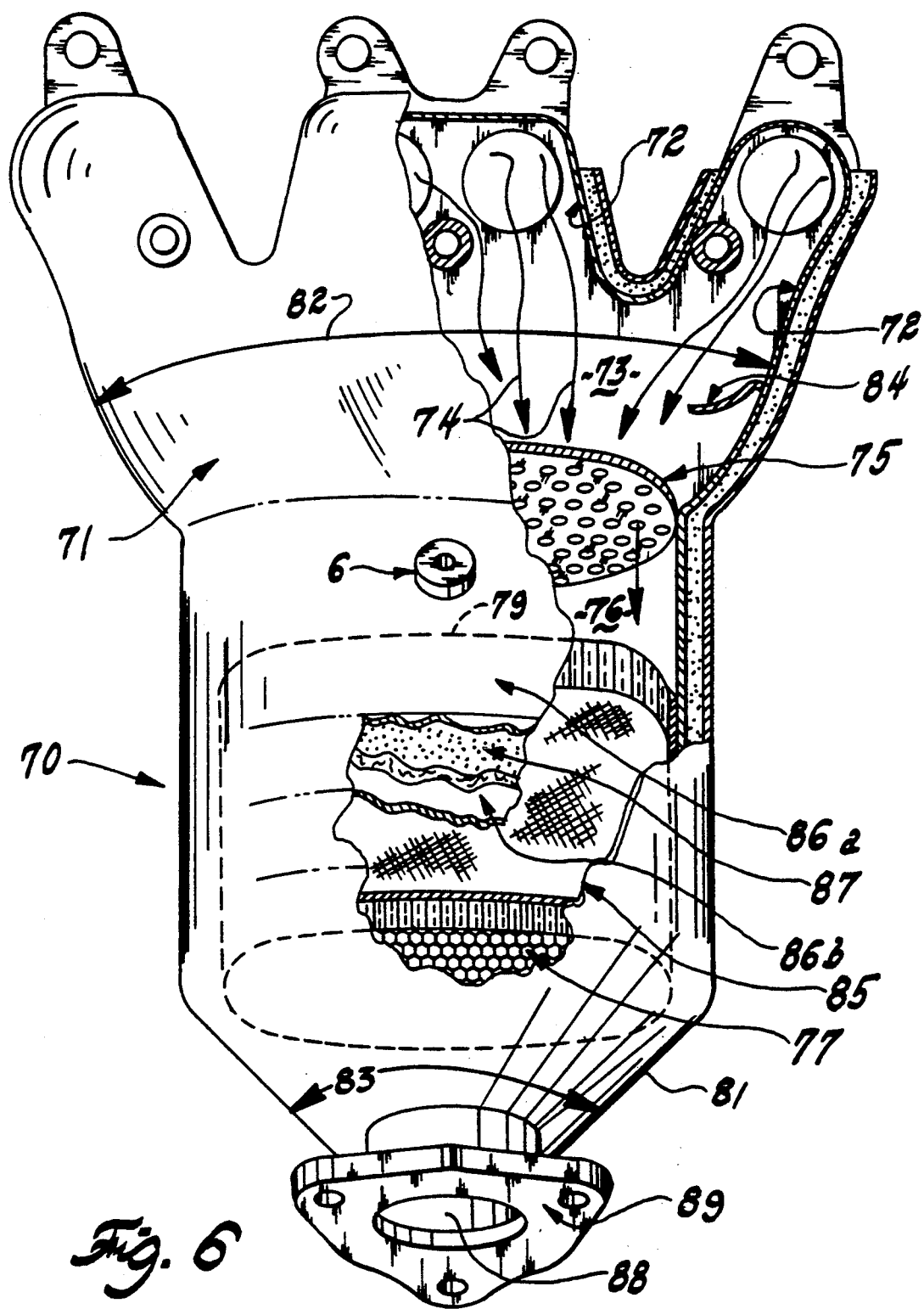
FIG. 6 is an alternative embodiment of the invention.

An alternative embodiment is illustrated in FIG. 6 wherein the integrated manifold-muffler-catalyst device 70 is adapted for being mounted directly to an engine block. The device has an expansion chamber 71 with preformed and integrated sheet metal gas collecting passages 72. These passages can be adapted for engine designs which have intake and exhaust ports on the same side of the cylinder head as well as engine designs with intake and exhaust ports on opposite sides of the cylinder head. The expansion chamber 71 is designed with curvilinear internal surfaces 72 to minimize thermally induced stresses while promoting stiffness to minimize effects of gas impingement and expansion. Directional vanes 84 may be used to facilitate streamline flow for promoting uniformity. The internal space 73 of the chamber is designed with sufficient volume to fully expand the firing pulses and attenuate low frequency sound to an acceptable level. This may be prior to the exhaust flow 74 entering a diffuser plate 75 extending across the flow path to further enhance uniform flow and before entering the catalyst 77. The effective perforated cross-sectional area of the diffuser is designed to be greater than the cross-sectional passage area of the catalyst so as not to significantly contribute to back pressure.

The geometry and interfaces created by now expanded gases are directed through flow convergence of walls 72 immediately prior to entering into the front face 79 of the catalyst 77 and are directed through a flow convergence section 81 immediately downstream of the catalyst 77. Flow convergence may be augmented or enhanced by the use of the direction vanes 84. The converging sections 72 and 81 promote attenuation of high frequency noise by the right amount of reflectance of the sound waves resulting in soundwave interference. The included angle 82, 83 of convergence of such sections should preferably be in the range of 75°–105°. The cooperative dual-stage convergence and/or enhanced uniformity of flow increases the conversion efficiency of the catalyst as compared to the performance of catalysts with conventional housing constructions.

The catalyst may be suspended within a mat mount material 85 (such as an intumescent material that expands with temperature) and is wrapped around the monolith 77 which in turn is supported in a two-ply steel shell 86 (plys 86a and 86b) having a thin layer of high temperature insulation material 87 encapsulated within the shell. The insulated shell improves catalyst warmup and retains heat for improved catalyst conversion efficiency while reducing the temperature external to the manifold for under-hood thermal management. The outlet 88 from the converging exit section 81 connects to a tailpipe via flange 89.

It is important to this invention to use a monolith ceramic substrate for the catalyst because of its unusually good attenuation characteristics for high frequency sound waves when coupled with converging entrance and exit sections. However, it may be possible that other pellet-type substrates or metal catalyst substrates be found to have some degree of high frequency attenuation. The shell and its shielding functions may be achieved by use of single or multiple pieces stampings or castings of substantially equivalent metal or ceramic material such that it is compatible with the temperatures of the operating environment without scaling or otherwise contaminating the exhaust gas recirculation catalyst or exhaust components. It is also within the scope of this invention that the vanes 84 and diffuser 75 may be deleted where flow uniformity can be achieved by convergence walls alone. It is further within the scope of this invention that insulating material may be deleted from the structure if the temperature profiles for the catalyst can be designed to meet acceptable requirements therewithout.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. An integral manifold-muffler-catalyst device for an internal combustion engine having a plurality of combustion cylinders generating exhaust gases, comprising:
   (a) a monolithic catalyst having a plurality of aligned passages for effecting laminar flow of said exhaust gases therethrough;
   (b) a high temperature resistant chamber assembly for close-coupling said catalyst to said engine having (i) an expansion chamber for substantially dissipating low frequency sound waves of said exhaust gases and for modifying high frequency sound waves of said exhaust gases and (ii) manifolding passages at one side of said expansion chamber for collecting and delivering the exhaust gases from said cylinders to the expansion chamber; and
   (c) means for effecting converging flow from said expansion chamber to and substantially the full entrance face of said aligned passages and for effecting converging flow from said catalyst, said dual-stage convergence reflecting and attenuating high frequency sound waves carried by said exhaust gases by interference.

2. The device of claim 1, in which said monolithic catalyst is further characterized by a honeycomb construction and the cell density of said honeycomb being 300–600 in$^2$.

3. The device of claim 1, in which said laminar flow means flow at a Reynolds number of 2000 or less.

4. The device of claim 1, in which said chamber assembly is dimensionally stable up to at least a temperature of 1625° F.

5. The device of claim 4, in which the chamber assembly has outer walls comprised of a two-ply shell with insulation sandwiched therebetween.

6. The device as in claim 1, in which said chamber has an expansion volume that is a multiple of at least seven of the volume of one said cylinder to attenuate the low frequency sound waves by about 20 dB(A).

7. The device as in claim 6, in which said low frequency sound waves are standing, characterized by the firing frequency of the engine and its first few harmonics and the resonant frequency of the overall length of the exhaust pipe.

8. The device as in claim 1, in which said means for effecting converging flow is characterized by an included convergence angle in the range of 75°–105°.

9. The device as in claim 1, in which said means for effecting converging flow uses at least one of vanes or a diffuser element to assist in attaining uniform flow across the front face and through said catalyst.

10. The device as in claim 1, in which said chamber assembly provides an expansion volume that is 4–12 times the displacement volume of a single cylinder of said engine.

11. The device as in claim 1, in which the front face of said catalyst has an aspect ratio of 1.5 to 2.5:1.

12. An exhaust pipe system for treating and dispersing exhaust gases from an internal combustion engine carried by a multiple axle vehicle, comprising:
   (a) a monolithic catalyst having a plurality of aligned curvilinear passages for effecting laminar flow of said exhaust gases through a shaped path while effecting attenuation of high frequency sound waves carried by said exhaust gases;

(b) a high temperature resistant chamber assembly for close-coupling the catalyst to said engine having an expansion chamber for substantially dissipating standing low frequency sound waves in said exhaust gases and for modifying high frequency sound waves in the exhaust gases, manifolding passages at one side of the expansion chamber for collecting and delivering the exhaust gases from the cylinders to the expansion chamber, and means for effecting converging flow from said expansion chamber to and across substantially the full entrance face of said aligned curvilinear passages; and (c) a generally horizontally extending tailpipe of uniform reduced diameter for conveying treated exhaust gases from said catalyst for dispersal behind the rear axle, said tailpipe being resiliently suspended except at its connection to said catalyst.

13. The system as in claim 12, in which the entrance and exit faces of said curvilinear passages have an included angle within the range of 10°–100°.

* * * * *